United States Patent [19]

Farag

[11] 4,077,687
[45] Mar. 7, 1978

[54] STAB ASSEMBLY FOR VERTICAL BUS BARS PLUG-ON UNIT

[75] Inventor: Samir F. Farag, Peru, Ind.

[73] Assignee: Square D Company, Park Ridge, Ill.

[21] Appl. No.: 608,316

[22] Filed: Aug. 27, 1975

Related U.S. Application Data

[63] Continuation of Ser. No. 490,645, Jul. 22, 1974, abandoned.

[51] Int. Cl.² .............................................. H01R 13/62
[52] U.S. Cl. .............................. 339/64 M; 339/112 R
[58] Field of Search ................... 339/64, 112, 210, 258

[56] References Cited

U.S. PATENT DOCUMENTS

| | | | |
|---|---|---|---|
| 3,478,299 | 11/1969 | Cinatl et al. | 339/64 M |
| 3,626,253 | 12/1971 | Sturdivan | 339/258 R |
| 3,787,801 | 1/1974 | Teagno et al. | 339/258 R |
| 3,806,859 | 4/1974 | Madarasz et al. | 339/258 R |

*Primary Examiner*—Joseph H. McGlynn
*Attorney, Agent, or Firm*—Ernest S. Kettelson; Harold J. Rathbun

[57] ABSTRACT

An electrical stab assembly for connection to vertical bus bars in an electric control center and which includes connector jaws floatably mounted in an insulated molded base. The floatable mounting permits the connector jaws to move with the bus bars to which they are connected, as the bus bars move due to thermal expansion, thus eliminating relative motion between the bus bars and the jaws connected thereto which is one of the basic causes of failure of stab type connector jaws.

11 Claims, 8 Drawing Figures

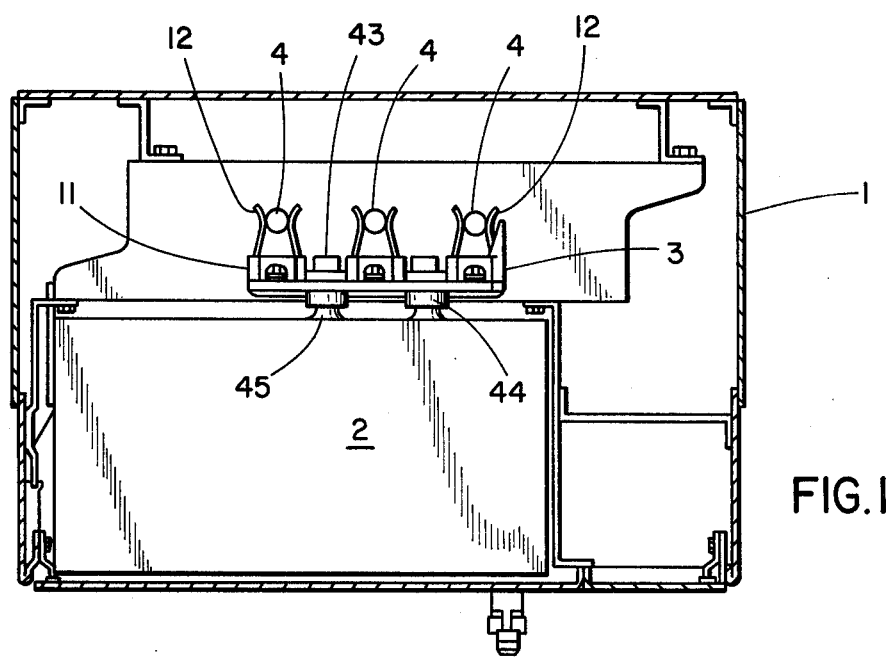
FIG. 1
FIG. 2
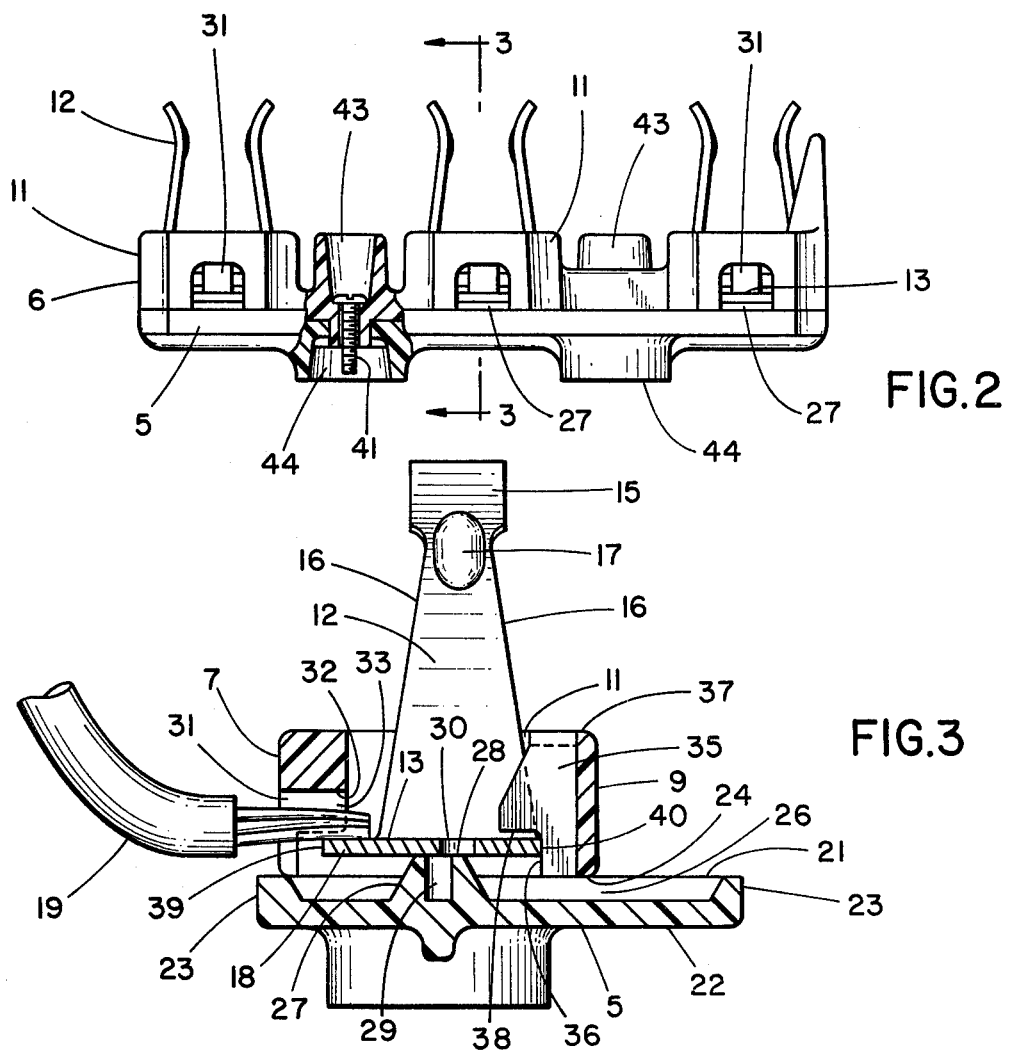
FIG. 3

STAB ASSEMBLY FOR VERTICAL BUS BARS PLUG-ON UNIT

This is a continuation of application Ser. No. 490,645, filed July 22, 1974, now abandoned.

BACKGROUND OF THE INVENTION

In stab assemblies comprising jaws of plug-on units for connections to bus bars in a control center, attempts have been made to improve the electrical contact and extend life of the stab assemblies in various ways. The stab connector shown in U.S. Pat. No. 3,778,748 provides a spring biased insert to urge the contact jaws together to improve the electrical connection to the bus bars. The stab assembly shown in U.S. Pat. No. 3,478,299 provides a two ply spring biased jaw arrangement including steel backup springs cradling the copper contact jaws to urge them securely against the bus bars for good electrical contact.

One of the major causes of failure of stab assemblies is relative motion between the bus bars and the jaws connected thereto which eventually weakens the connection until arcing occurs or until the contact jaws heat to the softening temperature of copper, or other conductive metal of which the contact jaws are made. The millivolt drop which corresponds to the softening temperature of copper is 120 millivolts for 190° C. The vertical bus bars in electric control centers to which plug-on units may be connected are moveable vertically due to thermal expansion of the bus, the motion cycle being within the range of 0.075 inches up and down when the current carried is sufficient to produce a 50° C temperature rise of the bus bars.

By providing jaws floatably mounted for reciprocating movement with the bus bars in accordance with this invention, relative motion between bus bars and jaws connected thereto is avoided thereby eliminating a major cause of stab failure.

SUMMARY OF THE INVENTION

It is an object of this invention to provide an electrical stab assembly having jaws floatably mounted to move longitudinally with bus bars to which they are connected as such bus bars move due to thermal expansion.

It is an object of this invention to provide an electrical stab assembly having resilient contact jaws able to maintain good electrical contact with bus bars without the need for separate and additional spring biasing means.

It is an object of this invention to provide an electrical stab assembly having unitary integrally formed jaws to provide both mechanical spring biasing contact and good electrical contact with bus bars in a control center.

It is an object of this invention to provide an electrical stab assembly having jaws which incorporate integrally formed heat sink means to maintain lower temperature of such jaws during connection to bus bars and thus extend their useful life.

It is an object of this invention to provide an electrical stab assembly having jaws which include an extended tab integral with the base of said jaws for brazing the connecting wires directly to the extended tab portion of the jaw base.

It is an object of this invention to provide an electrical stab assembly having jaws connectible directly to stab conducting wires to eliminate the need for a separate connecting lug thus reducing heat by avoiding one additional connection and providing more orderly and safer arrangement of conducting wires between jaw and plug-on connection.

It is an object of this invention to provide an electrical stab assembly constructed to utilize the advantage of contact jaws made of a highly conductive alloy having a higher softening temperature than copper and other superior characteristics.

BRIEF DESCRIPTION OF THE DRAWINGS

FIG. 1 is a cross section view of a control center plug-on unit illustrating an electrical stab assembly according to the present invention in engagement with the vertical bus bars of the control center.

FIG. 2 is an enlarged view of the stab assembly of FIG. 1.

FIG. 3 is a section taken on line 3—3 of FIG. 2. showing a jaw member in abutment against one side of its mounting pocket.

DESCRIPTION OF PREFERRED EMBODIMENT

Figure 4:
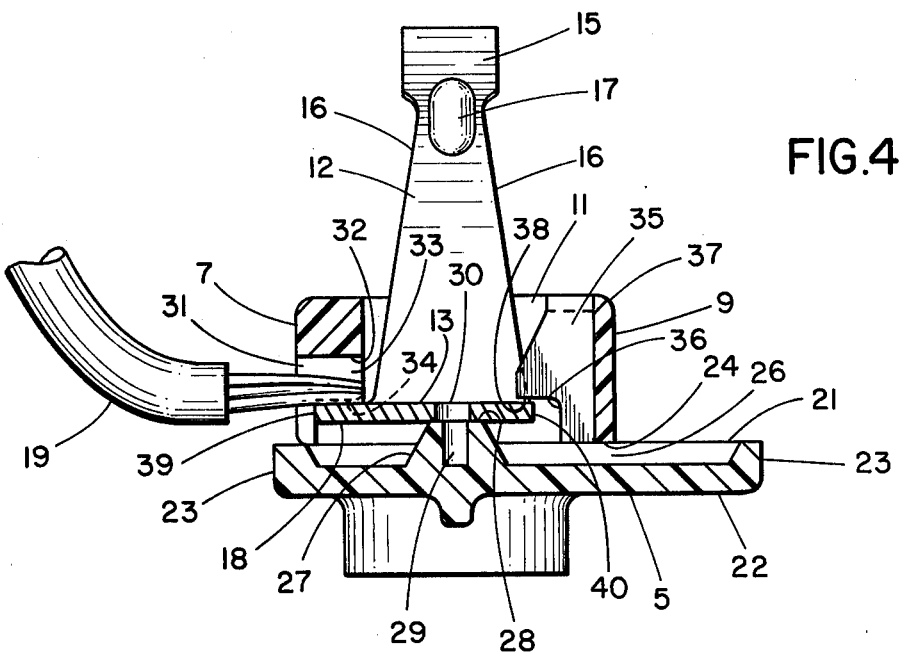
FIG. 4 is the section of FIG. 3 showing the jaw member in abutment against the opposite side of its mounting pocket.
Figure 5:
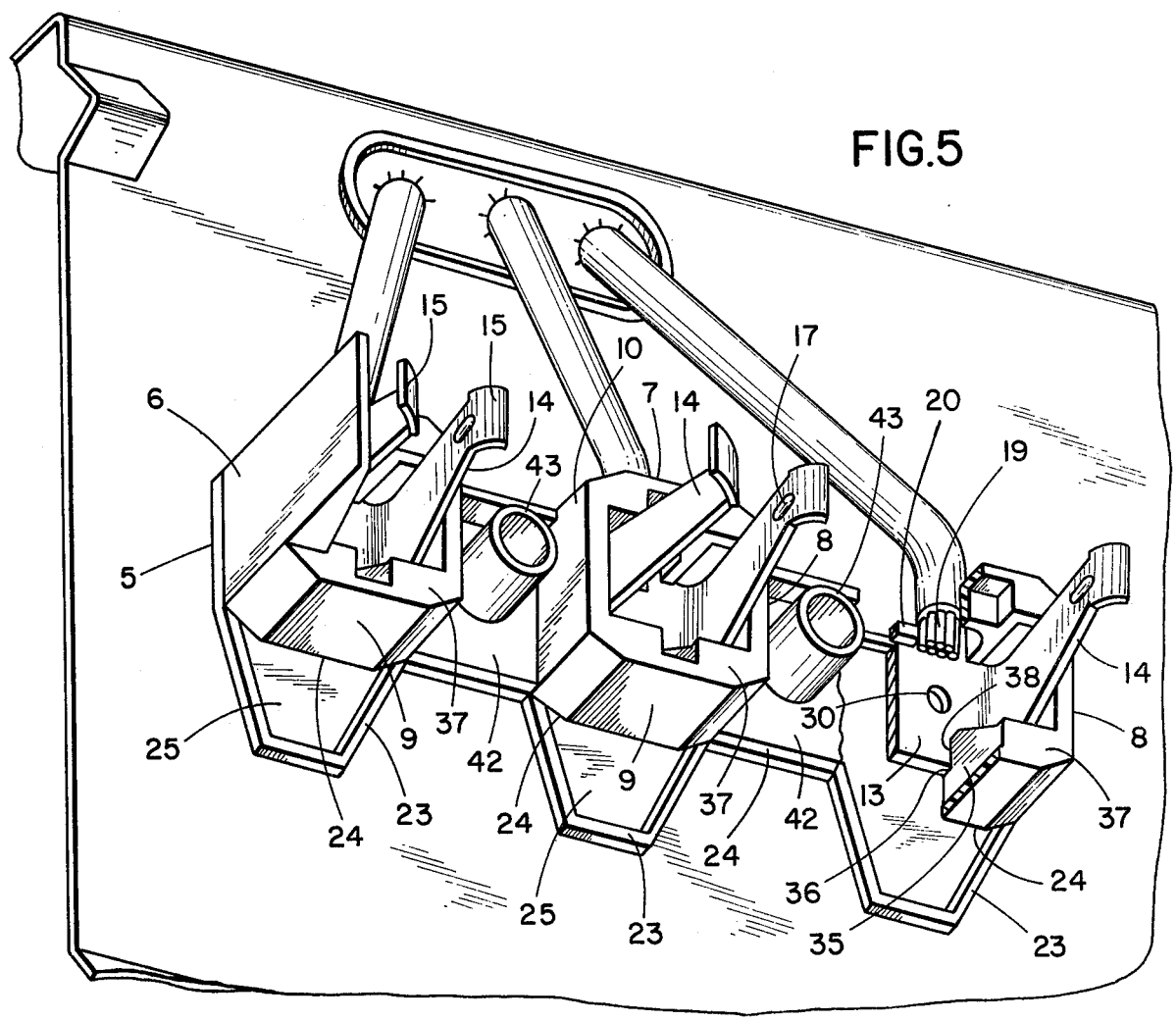
FIG. 5 is a perspective view of the stab assembly according to this invention shown partly in section and mounted on the wall of a plug-on unit.
Figure 6:
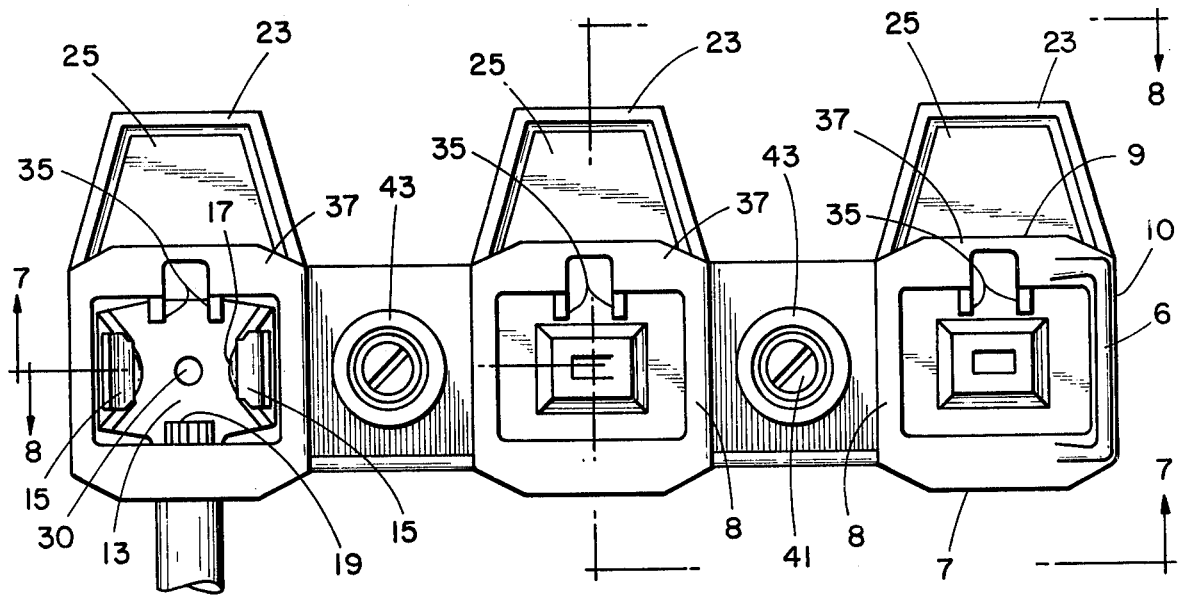
FIG. 6 is a plan view of the stab assembly.
Figure 7:
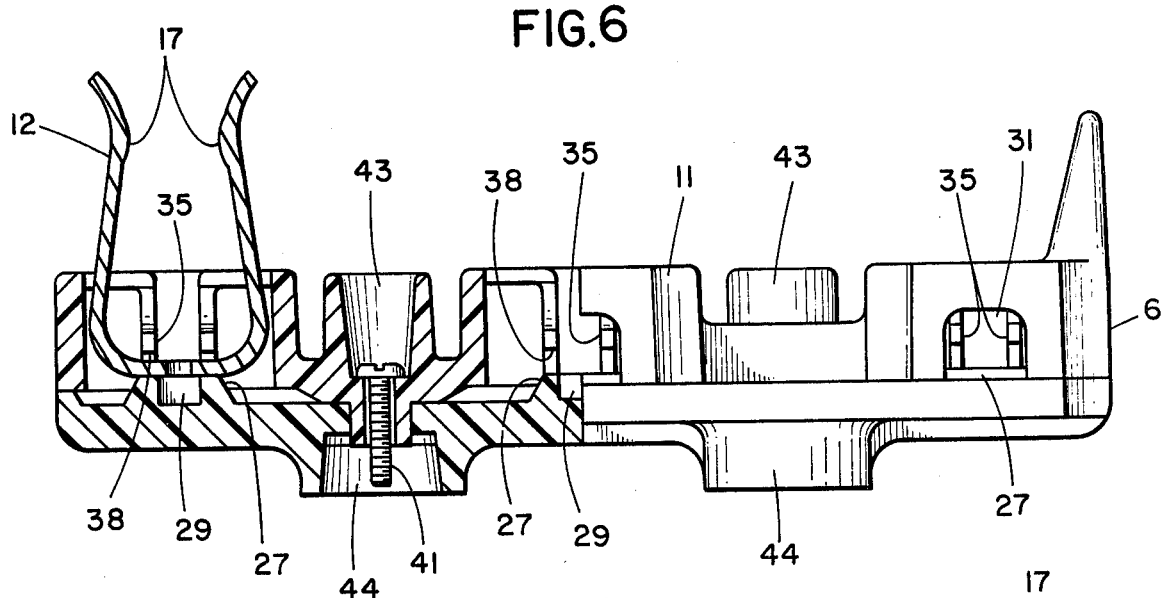
FIG. 7 is a section taken on line 7—7 of FIG. 6 showing the molded base member and pocket forming cap member.
Figure 8:
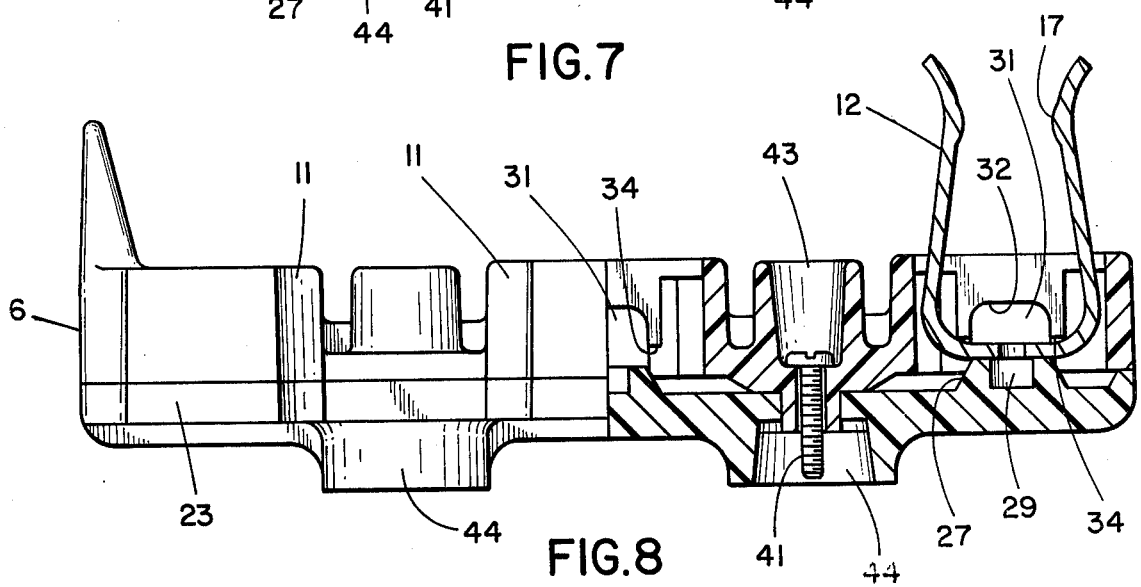
FIG. 8 is a section taken on line 8—8 of FIG. 6.

FIG. 1 of the drawings illustrates a cabinet section 1 of an electric control center of the type having horizontal feeder bus bars usually at the top and vertical bus bars extending therefrom for connection to the stab assemblies of plug-on units for a control devices such as motor starters, contractors and the like.

Within cabinet section 1, plug-on unit 2 is positioned for stab assembly 3 to engage vertical bus bars 4.

Stab assembly 3 includes a two part molded assembly comprising a base member 5 and a separable pocket forming cap member 6, each of which may be made of glass reinforced alkyd or other insulating composition having similar properties. Pocket forming cap member 6 includes integrally molded walls 7, 8, 9 and 10 forming pockets 11 to slidingly retain contact jaw members 12 therein for limited reciprocal movement between walls 7 and 9 as vertical bus bars 4 move vertically due to thermal expansion.

The contact jaw members 12 are integrally formed and made of a metal which has high electrical conductivity, high softening temperature, good creep resistance, good stress and corrosion resistance, sufficient spring contact force to maintain tight electrical contact between the jaw members and bus bars, and which will maintain its fine grain structure after heating to annealing or soldering temperatures. A material which meets these requirements is CDA-alloy 194-HSM copper, made by Olin Brass, a company of Olin Corporation. The nominal composition of this alloy is 97.5% copper, 2.35% iron, 0.03% platinum and 0.12% zinc.

The jaw members 12 include lateral base 13 and jaw arms 14 which project outwardly from opposite ends of base 13 in the same general direction but at an incline towards each other to provide a narrowing gap there between to grippingly receive a bus bar 4. The free ends of arms 14 flare outwardly away from each other at their tip regions 15 to center a bus bar 4 as it is slidingly received between jaw arms 14.

The side edges 16 of jaw arms 14 converge from their junction at base 13 to tip regions 15 whereupon the side edges 16 diverge to form expanded tip regions 15. The expanded tip regions 15 of each jaw arm 14 provides a heat sink. Convex contact surfaces 17 are formed to project from the inner face of each jaw arm 14 across the narrow portion of the gap therebetween. p Lateral base 13 of jaw members 12 includes a planar projecting tab 18 extending outwardly in the same plane as base 13 and as an integral extension thereof to which stab connecting wires 19 are directly brazed. Separate connecting means are not necessary to couple said wires to jaw members 12. A projecting lug 20 may be formed to extend upward from an edge of projecting tab 18 to abut against connecting wires 19 and serve as a heat sink at this joint.

Molded base member 5 includes a contact mounting side 21 and an opposite fixture mounting side 22. A peripheral raised ridge 23 projects laterally from the contact mounting side 21 around the periphery of base member 5. The abutting edge 24 of pocket forming cap member 6 rests against peripheral ridge 23 and is spaced apart thereby from the surface of base member 5. Base member 5 conforms generally to the peripheral configuration of pocket forming cap member 6, but includes extension panels 25 which extend beyond the peripheral walls 9 of pockets 11. A space 26 is thus provided between edge 24 of wall 9 and base member 5 to provide ventilation and means to dissipate heat.

The portion of peripheral ridge 23 which corresponds to pocket wall 7 lies slightly outward of wall 7 to provide space between edge 24 of wall 7 and base member 5 for additional ventilation and circulation of air.

Raised bosses 27 project from contact mounting side 21 of base member 5 positioned to lie centrally of pockets 11 when pocket forming cap member 6 is mounted on base member 5. The bosses 27 provide a flat abutment surface 28 for lateral base 13 of jaw members 12, and space the base 13 of such jaw members apart from the surface of contact mounting side 21 of base member 5 for air circulation and dissipation of heat. A recess 29 is provided centrally of bosses 27 open to communicate with hole 30 through a central portion of lateral base 13 of jaw members 12, such recesses 29 and corresponding holes 30 serving as additional ventilation and heat dissipation means.

The pockets 11 formed in molded cap member 6 include walls 7, 8, 9 and 10. A wall recess 31 is formed in wall 7 opening along the edge 24 thereof, through which extend the stab connecting wires 19 brazed to tab 18 of contact jaw members 12. A shoulder 32 protrudes from the inner surface of wall 7 having depending arms 33 bordering opposite sides of wall recess 31 and an abutment surface 34 at free ends of arms 33. The abutment surfaces 34 lie in a plane parallel to and spaced apart from the plane in which the flat abutment surface 28 of bosses 27 lie when pocket forming cap member 6 is mounted in place on base member 5.

Diametrically opposite wall recess 31 and shoulder 32 of the inner surface of wall 7, a pair of keeper ribs 35 protrude from the inner surface of wall 9. Inward facing edges 36 of ribs 35 provide abutment surfaces spaced apart inwardly from wall 9 and extending parallel to wall 9 from a beginning even with edge 24 in a direction towards opposite edge 37 of wall 9 until reaching the plane in which abutment surfaces 34 of shoulder 32 lie. At such point, keeper ribs 35 project inwardly to form corresponding abutment surfaces 38 lying in said plane of abutment surfaces 33, both of said abutment surface means serving to limit movement of lateral base 13 of jaw members 12 between such surfaces and abutment surface 28 of bosses 27 thereby retaining jaw members 12 loosely seated in pockets 11.

The jaw members 12 are seated in pockets 11 with projecting tabs 18 of base 13 facing wall recess 31 and the inner surface of wall 7. Tabs 18 are formed with a leading edge 39 wider than recess 31 whereby said leading edge 39 abuts against the inner surface of wall 7 at each side of recess 31 to limit movement of jaw members 12 in the direction toward walls 7.

The edge 40 of lateral base 13 of jaw members 12 opposite tab 18 faces edges 36 of keeper ribs 35 of wall 9, which limit movement of jaw members 12 in the direction toward walls 9.

The measurement from leading edge 39 of tabs 18 to opposite edge 40 of lateral base 13 of jaw members 12 is somewhat less than the measurement from inner surface of wall 7 to the oppositely placed inward facing edges 36 of ribs 35. The jaw members 12 may thereby move between wall 7 and keeper ribs 35 of wall 9 a distance equal to the difference between such two measurements. The distance selected for use of this invention in control centers of the usual size is approximately 0.100 inches. This permits the jaw members 12 to move with the vertical bus bars 4 to which they are connected, as such bus bars move due to thermal expansion. The maximum movement of the vertical bus bars due to thermal expansion at 50° C. rise has been calculated to be 0.075 inches in control centers of the usual size.

The distance between opposite walls 8 and 10 conforms to the dimension of lateral base 13 between jaw arms 14, whereby the inner surfaces of walls 8 and 10 loosely retain base 13 therebetween. The inward incline of jaw arms 4 as they project outward from base 13 provides increasing play between such arms and corresponding walls 8 and 10, which allows jaw members 12 to rock on bosses 27 to a limited extent between walls 8 and 10. This enables the flared free ends of jaw arms 14 to receive and center on vertical bus bars 4 for good electrical connection even though the stab assembly 3 and plug-on unit 2 may be slightly out of alignment when placed in the control center.

Pocket forming member 6 is secured to molded base member 5 by threaded screw fasteners 41 which extend through spaced sections 42 in said members provided between pockets 11. Cylindrical walls 43 projecting outward from member 6 surround the head end of threaded screws 41. Clindrical sleeves 44 project in the opposite direction from fixture mounting side 22 of molded base member 5, to receive corresponding mounting posts 45 of plug-on unit 2. The mounting posts 45 may be internally threaded to receive screws 41, thereby securing the stab assembly 3 to the plug-on unit 2 so contact jaw members 12 will be aligned for connection to vertical bus bars 4 when mounted in a control center for use.

I claim:

1. An electrical stab assembly for a plug-on unit comprising an insulated molded base member, a cap member mounted thereon, floatable seating means provided by said base member and cap member, contact jaw means associated therewith and mounted in said seating means for limited reciprocal movement to move axially with bus bars to which said jaw means are connected as said bus bars move axially in one direction a first pre-determined distance due to thermal expansion and back in the opposite direction the same pre-determined distance when current flow decreases permitting said bus bars to cool and thus contract, the dimension of said seating means which corresponds to the directions of said axial movement being greater than the corresponding dimension of said jaw means seated therein by at least the amount of said first pre-determined distance to permit such jaw means to move axially therein freely and together with said bus bars.

2. An electrical stab assembly as set forth in claim 1, wherein said floatable seating means includes pocket means formed by said cap member and said base member, said pocket means including peripheral wall portions formed in said cap member projecting outwardly from said base member when mounted thereon, first bearing means associated with said pocket means spaced outwardly from said base member to retain said contact jaw means therein, second bearing means associated with said pocket means to provide limited sliding longitudinal movement of said contact jaw means therein, said second bearing means including spaced apart abutment surface portions, such spacing being in the direction of axial movement of said bus bars due to thermal expansion, the distance between said spaced apart abutment surfaces being greater than the corresponding dimension of said jaw means seated in said pocket means by at least the amount of said first pre-determined distance to permit said jaw means to move longitudinally therein, being in the direction of axial movement of said bus bars, and third bearing means associated with said pocket means to retain said contact jaw means against substantial lateral movement therein, said third bearing means including spaced apart abutment surface portions, such spacing corresponding to the lateral dimension of the base portion of said jaw means.

3. An electrical stab assembly as set forth in claim 1 wherein said first pre-determined distance is approximately 0.075 inches, the said dimension of said seating means being greater than the corresponding dimension of said jaw means by the amount of approximately 0.100 inches.

4. An electrical stab assembly as set forth in claim 1 wherein said contact jaw means comprises a unitary jaw member, including a base portion, jaw arms projecting laterally from each end of said base and formed integrally therewith, electrical connection means integrally formed with said base portion to join connecting wires directly to said contact jaw means.

5. An electrical stab assembly as set forth in claim 4, wherein said electrical connection means includes a planar projecting tab extending outwardly from the periphery of said base portion in the plane thereof.

6. An electrical stab assembly as set forth in claim 5, wherein said planar projecting tab extends from the periphery of said base portion at a location between the jaw arms of said contact jaw means.

7. An electrical stab assembly as set forth in claim 6 including an upwardly projecting lug integrally formed with said base portion of said contact jaw means and positioned thereon adjacent said planar projecting tab.

8. An electrical stab assembly for a plug-on unit, comprising an insulated molded base member, a cap member mounted thereon, floatable seating means provided by said base member and cap member, contact jaw means associated therewith and mounted in said seating means for limited reciprocal movement to move with bus bars to which said jaw means are connected as said bus bars move due to thermal expansion, wherein said molded base member includes an upstanding ridge around its periphery, said cap member bearing against said peripheral ridge when affixed to said molded base member and being thus spaced from the surface thereof, extension panel means formed on said molded base member projecting outward beyond the periphery of said cap member when affixed to said molded base member, ventilation slot means provided thereby between edge portions of said cap member which are in cooperating relationship with said extension panel means of said molded base member when affixed thereto.

9. An electrical stab assembly as set forth in claim 8, including raised boss means projecting from the surface of said molded base member and centered in said pocket means, said boss means including a flat abutment surface for bearing engagement with the base of said contact jaw means to space said contact jaw means from the surface portions of said molded base member surrounding said raised boss means, thereby providing air circulation means between said contact jaw means and molded base member for dissipation of heat.

10. An electrical stab assembly as set forth in claim 9, wherein said raised boss means include recess means formed centrally therein, said contact jaw means include hole means centrally through the base thereof for communication with said recess means of said raised boss means to thereby provide air circulation and heat dissipation means.

11. An electrical stab assembly as set forth in claim 10, wherein said jaw arms include convex contact surfaces formed on the inner faces of said jaw arms and which project therefrom across the narrow portion of the gap between said jaw arms.

* * * * *

UNITED STATES PATENT AND TRADEMARK OFFICE
CERTIFICATE OF CORRECTION

PATENT NO. : 4,077,687
DATED : 3/7/78
INVENTOR(S) : S. F. Farag

It is certified that error appears in the above-identified patent and that said Letters Patent are hereby corrected as shown below:

Col. 3, line 10, "p" before "Lateral". This should be beginning of new paragraph.

Signed and Sealed this

Tenth Day of July 1979

[SEAL]

Attest:

Attesting Officer

LUTRELLE F. PARKER
Acting Commissioner of Patents and Trademarks